US006808733B2

(12) United States Patent
Barndt et al.

(10) Patent No.: US 6,808,733 B2
(45) Date of Patent: *Oct. 26, 2004

(54) LOW CALORIE, PALATABLE FIBER-CONTAINING, SUGAR SUBSTITUTE

(75) Inventors: Richard L. Barndt, Highland Park, NJ (US); Shyhyuan Liao, West Windsor, NJ (US); Carolyn M. Merkel, North Haledon, NJ (US); William J Chapello, Atlantic Highlands, NJ (US); Juan L. Navia, Athens, GA (US)

(73) Assignee: McNeil-PPC, Inc., Skillman, NJ (US)

( * ) Notice: Subject to any disclaimer, the term of this patent is extended or adjusted under 35 U.S.C. 154(b) by 169 days.

This patent is subject to a terminal disclaimer.

(21) Appl. No.: 10/128,344

(22) Filed: Apr. 24, 2002

(65) Prior Publication Data

US 2003/0054080 A1 Mar. 20, 2003

Related U.S. Application Data

(63) Continuation of application No. 09/052,434, filed on Mar. 31, 1998, now Pat. No. 6,423,358.
(60) Provisional application No. 60/044,748, filed on Apr. 18, 1997.

(51) Int. Cl.7 .............................................. A23L 1/236
(52) U.S. Cl. ...................................... 426/548; 426/658
(58) Field of Search ................................ 426/548, 615, 426/658

(56) References Cited

U.S. PATENT DOCUMENTS

| | | | |
|---|---|---|---|
| 4,311,722 A | 1/1982 | Vink et al. | 426/660 |
| 4,746,520 A | 5/1988 | Smits et al. | 426/103 |
| 5,238,698 A | 8/1993 | Zumbe et al. | 426/572 |
| 5,490,996 A | 2/1996 | Despland et al. | 426/548 |
| 5,547,697 A | 8/1996 | Lipsch et al. | 426/565 |
| 5,882,709 A | 3/1999 | Zumbe | 426/481 |
| 6,423,358 B1 * | 7/2002 | Barndt et al. | 426/548 |

FOREIGN PATENT DOCUMENTS

| | | |
|---|---|---|
| DE | 195 14 274 | 10/1996 |
| EP | 0 787 745 | 8/1997 |
| EP | 0 861 852 | 9/1998 |
| WO | 91/13076 | 9/1991 |
| WO | 93/02566 | 2/1993 |
| WO | 98/38223 | 9/1998 |
| WO | 98/42206 | 10/1998 |

OTHER PUBLICATIONS

E. Berghofer et al., "Pilot–scale Production of Insulin from Chicory Roots and its Use in Foodstuffs," Elsevier, Amsterdam XP002058196 211850 pp. 77–84 (1993).

* cited by examiner

Primary Examiner—Leslie Wong
(74) Attorney, Agent, or Firm—RatnerPrestia

(57) ABSTRACT

This invention relates to a low calorie, palatable fiber-containing, sugar substitute composition suitable for use as a substitute for table sugar (for use on cereals, fruits, in hot or iced tea and coffee, etc.) and in the preparation of baked foods and other prepared solid and semi-solid foods.

9 Claims, No Drawings

LOW CALORIE, PALATABLE FIBER-CONTAINING, SUGAR SUBSTITUTE

The present application is a continuation of U.S. patent application Ser. No. 09/52,434, filed 31 Mar. 1998, now U.S. Pat. No. 6,423,358, and claims, under 35 U.S.C. 119, the benefit of U.S. Provisional Patent Application No. 60/044,748, filed on 18 Apr. 1997.

The invention relates to a low calorie, palatable fiber-containing, sugar substitute suitable for use as a substitute for table sugar (for use on cereals, fruits, in hot or iced tea and coffee, etc.) and in the preparation of baked foods and other prepared solid and semi-solid comestibles.

BACKGROUND OF THE INVENTION

The preparation of cakes, cookies, ice cream, puddings, and other solid and semi-solid comestibles that have a significantly reduced calorie content and which retain the quality of conventional comestibles has been an elusive goal. Sugars such as sucrose, corn sweeteners, honey, etc., play several roles in comestibles, so when they are replaced with low calorie substitutes, more than just sweetness must be provided for by their replacement products. For instance, in addition to sweetness, sugar provides bulk, it reduces the water activity in baked goods by immobilizing water, it acts as a humectant to thereby affect the moisture of the finished product, and it affects the gelatinization temperature of starches during baking, and thereby plays a significant role in the structure, volume, and tenderness of the finished product. In ice cream, sugar provides texture, viscosity, mouthfeel, and freezing point depression. In semi-solid comestibles, sugar contributes to the basic texture of the product.

High intensity sweeteners can provide the sweetness of sugar (although often with a slightly different taste), but since they are many times sweeter than sugar, only a small amount is needed to replace the sugar. Therefore, in solid and semi-solid food applications (e.g., table sugar substitutes, baked goods, fruit pie fillings, cereal bars, semi-solid comestibles such as ice cream, soft candies, gelatins, custards, puddings, sweet sauces, and the like), high intensity sweeteners are usually mixed with a low calorie bulking agent such as polydextrose, microcrystalline cellulose, polyols (e.g., sorbitol) and many others. The intent is for the bulking agent to fulfill as many of sugar's roles as possible. To date, however, no fully satisfactory bulking agent has been found. For instance, the polyol bulking agents provide a cooling sensation (negative heat of solution) that is not desirable in many food applications and they provide only a modest calorie reduction. Polydextrose does not participate in the browning reactions that are desirable in the preparation of many baked goods. Also, polydextrose is quite hygroscopic; as a result, comestibles containing polydextrose may have a tendency to pick up moisture, resulting in a sticky or tacky texture.

The present invention provides a low calorie, palatable fiber-containing, sugar substitute suitable for use in solid and semi-solid food applications that satisfactorily fulfills many of the roles of sugar without significantly compromising the sensory qualities imparted by sugar.

SUMMARY OF THE INVENTION

The invention provides a solid, low calorie, palatable fiber-containing, sugar substitute that comprises inulin plus a high intensity sweetener such as sucralose, aspartame, saccharin, cyclamate, alitame, acesulfame potassium, or mixtures thereof. The invention also provides baked goods and other solid and semi-solid comestibles prepared from the low calorie, palatable fiber-containing, sugar substitute of the invention.

DETAILED DESCRIPTION OF THE INVENTION

Inulin, the component of the invention that acts as the principal bulking agent and which fulfills many of the other functions of sugar (other than sweetness), is a naturally occurring fructo-oligosaccharide composed of a mixture of oligomers of varying degrees of polymerization ("DP") or molecular weights that occurs naturally plants such as onion, garlic, Jerusalem artichoke, dahlia and chicory for plant energy storage. In addition to fulfilling many of the non-sweetener functions of sugar, inulin is an excellent palatable soluble food fiber. For use in the invention, inulin having a degree of polymerization of from about 2 to about 20 is preferred. That is, the preferred inulin for use in the invention is a polysaccharide having an average of from about 2 to about 20 sugar units per molecule. More preferably, about 80% (by weight) of the inulin used in the invention has a median degree of polymerization of from about 4 to about 6. The primary factors to be considered in selecting the degree of polymerization are solubility/clarity in aqueous solutions and viscometric effects (i.e., thickening equivalent to that of sugar at a similar sweetening effect). The preparation of inulin having the above-indicated degrees of polymerization can be by the process described in U.S. patent application Ser. No. 08/783,085, PREPARATION OF INULIN PRODUCTS, filed on Jan. 15, 1997, now U.S. Pat. No. 5,968,365 by Kathleen S. Laurenzo et al., and assigned to the sane assignee as this application, the disclosure of which is incorporated herein by reference. Other processes (such as the processes used commercially to produce "Raftilose" and "Neo-sugar") can also be used to produce the inulin used in the invention.

The preferred high intensity sweetener that is employed in the invention is sucralose, which is the compound 4,1',6'-trichloro-4,1',6'-trideoxygalactosucrose. Sucralose is especially preferred in recipes that require thermal processing (baking, retorting, extrusion, etc.), because of its heat stability and high quality sensory attributes. In the preparation of prepared foods (baked goods, comestibles, etc.), sucralose (or other high intensity sweetener) is used in the recipe in the amount to provide the equivalent amount of sweetness of the sugar it replaces. Sucralose is about 600 times as sweet as sugar. Therefore, sucralose is employed in approximately 1/600 the amount of sugar replaced. The inulin is preferably employed in an amount approximately equal to the bulk of the sugar that is replaced. Since its specific gravity is about 0.6–0.7 (compared to a specific gravity of sugar of about 0.8), on a weight basis, inulin is used in about a 3:4 inulin:sugar ratio (that is, the weight of the sugar replaced). In recipes for prepared foods, the inulin and the high intensity sweetener can be added together in a combined product, or they can be added separately.

In preparing table sugar substitute (to be used in home baked goods, in hot or iced coffee and tea, on cereals and fruits, and in other foods to replace sugar), the sucralose/-inulin composition can be produced by dry mixing, co-spray drying, co-freeze drying, agglomeration, blending, co-drying, extrusion, or by any other convenient process. The primary consideration is that the sweetness delivery needs to be uniform. Sucralose and inulin can be blended in a weight ratio of 0.1–2.4:99.9–97.6 sucralose: inulin. Sucralose (along with other bulking agents such as maltodextrin, polydextrose, or other oligosaccharide) and/or flavorings can also be co-dried or spray-dried on inulin to produce tabletop products with densities ranging from 0.1 g/cc to 0.8 g/cc. The inulin/sucralose tabletop products will usually have densities ranging from 0.1 g/mL to 0.8 g/mL, and preferably from 0.3 to 0.4 g/mL. [At higher densities (greater than 0.3/g/mL), such inulin/sucralose tabletop sugar substitute is a good source of fiber which promotes the growth of beneficial colonic bacteria such as lactobacillus and bifidobacteria.] Such tabletop inulin/sucralose products have from about ½ to about ⅛ the amount of calories of the sugar they replace. Other ingredients such as maltodextrin, polyols (e.g., sorbitol), and flavorings, can be added to improve the quality and stability of the inulin-based table sugar. Normally, the bulking agent portion of the composition includes inulin at a level of from about 20% to 100% (by weight) and other bulking agents such as maltodextrin in proportions of from 0% to about 80%, by weight. When the high intensity sweetener is not sucralose, the table top sugar substitute can be made by analogous procedures using similar considerations (such as the degree of sweetness of the high intensity sweetener compared with sucrose).

The inulin/high intensity sweetener mixture is used in the preparation of baked goods and other solid or semi-solid comestibles (i.e., excluding soft drinks, fruit drinks, and other liquids) in an amount such that the caloric content of the comestible is significantly less than the corresponding comestible made with sugar (e.g., from about 5% fewer calories up to a one-third or more reduction in calories).

The inulin/sucralose tabletop composition can be a cup-for-cup replacement of sugar in home recipes. Inulin and sucralose or other high intensity sweetener(s) can be prepared according to the aforementioned levels. For example, at 1.2:98.8 weight ratios of sucralose: inulin/maltodextrin and at bulk density of 0.1 g/cc, this composition is a cup-for-cup replacement for sugar. Another example is at 0.3:99.7 sucralose:inulin/maltodextrin/-flavorants and at bulk density of 0.4 g/cc, this composition is also a cup-for-cup replacement of sugar.

The recipes shown below illustrate the use of the inulin/sucralose composition of the invention in the preparation of baked goods and other comestibles. An important objective of the present invention is the direct replacement of sugar in some convenient weight or volume measure in such a manner as to require minimal or no modification of the commercial or home-use recipes. This is a key consideration from the standpoint of ease of use, and one in which other bulking agents have traditionally been less than successful.

Soft Serve Ice Cream

Control

| | | |
|---|---:|---:|
| Whole milk | 2975.6 gm | 74.4% |
| Non fat Milk powder | 279.6 gm | 7.0% |
| Corn syrup solids 35 DE | 239.7 gm | 6.0% |
| Sugar | 479.3 gm | 12.0% |
| Tempo (emulsifier/stabilizer) | 20.0 gm | 0.5% |
| Vanilla flavor | 6.0 gm | 0.15% |

Inulin-Sucralose based Product

| | | |
|---|---:|---:|
| Whole milk | 2731.6 gm | 68.3% |
| Non fat Milk powder | 160.0 gm | 6.0% |
| 75% aqueous inulin solution | 800.0 gm | 20.0% |
| Dry inulin | 120.0 gm | 2.0% |
| Sucralose, 25% solution | 2.4 gm | 0.06% |
| Tempo (emulsifier/stabilizer) | 20.0 gm | 0.5% |
| Pascelli Excel (modified starch) | 160.0 gm | 4.0% |
| Vanilla flavor | 6.0 gm | 0.15% |

Marshmallow

Control

| | | |
|---|---:|---:|
| Sugar | 819.0 gm | 41.0% |
| Invert syrup | 68.0 gm | 3.4% |
| Corn syrup 42 DE | 550.0 gm | 27.5% |
| Water | 230.0 gm | 11.5% |
| Gelatin, 250 Bloom | 34.0 gm | 1.7% |
| Egg Albumen, P-20, Henningson | 6.0 gm | 0.3% |
| Water | 288.0 gm | 14.4% |
| Vanilla flavor | 5.0 gm | 0.25% |

Inulin-Sucralose based Product

| | | |
|---|---:|---:|
| 75% aqueous inulin solution | 1600.0 gm | 77.4% |
| Water | 288.0 gm | 13.9% |
| Gelatin, 250 Bloom | 60.0 gm | 2.9% |
| Egg Albumen, P-20, Henningson | 10.0 gm | 0.5% |
| Sorbitol | 100.0 gm | 4.8% |
| Vanilla flavor | 5.0 gm | 0.25% |
| Sucralose, 25% aqueous solution | 3.0 gm | 0.15% |

Cookies

Control

| | | |
|---|---:|---:|
| Butter | 341.0 gm | 32.9% |
| All purpose flour | 437.6 gm | 42.2% |
| Sugar | 200.0 gm | 19.3% |
| Whole egg | 50.0 gm | 4.8% |
| Baking powder | 4.6 gm | 0.4% |
| Vanilla flavor | 4.8 gm | 0.5% |

Inulin-Sucralose based Product

| | | |
|---|---:|---:|
| Butter | 341.0 gm | 32.9% |
| All purpose flour | 437.6 gm | 42.2% |
| Dry inulin | 200.0 gm | 19.3% |
| Whole egg | 50.0 gm | 4.8% |
| Baking powder | 4.6 gm | 0.4% |
| Vanilla flavor | 4.8 gm | 0.5% |
| Sucralose, 25% aqueous solution | 1.0 gm | 0.1% |

Chocolate Cake

Control

| | | |
|---|---:|---:|
| All purpose flour | 250.0 gm | 20.5% |
| Sugar | 350.0 gm | 28.8% |
| Baking powder | 4.6 gm | 0.4% |
| Baking soda | 3.4 gm | 0.3% |
| Salt | 1.3 gm | 0.1% |
| Water | 315.2 gm | 25.9% |
| Shortening | 102.5 gm | 8.4% |
| Whole egg | 100.0 gm | 8.2% |
| Unsweetened baking chocolate | 84.9 gm | 7.0% |
| Vanilla flavor | 4.7 gm | 0.4% |

Inulin-Sucralose based Product

| | | |
|---|---:|---:|
| All purpose flour | 300.0 gm | 20.0% |
| Dry inulin | 280.0 gm | 23.4% |
| Baking powder | 4.6 gm | 0.4% |

-continued

| | | |
|---|---|---|
| Baking soda | 3.4 gm | 0.3% |
| Salt | 1.3 gm | 0.1% |
| Water | 315.2 gm | 26.3% |
| Shortening | 102.5 gm | 8.6% |
| Whole egg | 100.0 gm | 8.3% |
| Unsweetened baking chocolate | 84.9 gm | 7.1% |
| Vanilla flavor | 4.7 gm | 0.4% |
| Sucralose, 25% aqueous solution | 1.6 gm | 0.1% |

In all of the above examples the product made without sugar was judged acceptable and of good quality relative to the sugar control.

The versatility of the invention has also been demonstrated by the preparation of peanut brittle, chocolate chips, chocolate coating, nougat, ginger snap cookies, yellow cake, cheese cake, and meringue using the present inulin/sugar substitute as the sweetener. All were adjudged to be satisfactory.

The following examples further illustrate the invention (in which temperatures are given in ° F.):

EXAMPLE 1
Yellow Cake
- 3 cups all-purpose flour
- 2 cups sugar or sugar/inulin mixture
- 1 tablespoon baking powder
- 1 ½ cups milk
- ½ cup margarine or butter, softened
- ½ teaspoons vanilla
- 2 eggs Procedure Combine all ingredients, except eggs, in a mixing bowl. Mix until combined, then beat on high speed for 2 minutes. Add eggs. Beat mixture on high for 2 minutes. Pour batter into 2 greased and floured 8×8×2-inch round baking pans. Bake in a 375° F. oven for 25 to 30 minutes, or until a toothpick inserted near the centers come out clean. Cool on wire racks for 10 minutes. Remove from pans. Cool thoroughly on racks.

For 40%[1], 50%, 60%, 70% inulin replacement by mass batches, use above procedure, substituting inulin for sugar. Also use a calculated amount of 25% aqueous sucralose concentrate for sweetness adjustment.

[1] I.e., 40% replacement means that 40%, by volume, of the sugar is replace by insulin.

| SENSORY RESULTS | | | | | |
|---|---|---|---|---|---|
| | Control | 40% | 50% | 60% | 70% |
| Appearance | 7.4 | 4.3 | 5.2 | 5.3 | 6.3 |
| Sweetness | 6.5 | 5.4 | 5.3 | 6.0 | 6.3 |
| Texture | 6.9 | 4.3 | 5.4 | 5.4 | 6.1 |
| Flavor | 6.2 | 5.1 | 5.2 | 5.7 | 6.2 |
| Overall Acceptability | 6.7 | 4.4 | 4.8 | 5.7 | 6.1 |
| % Calorie Reduction per 100 g serving | 0 | 19 | 21 | 22 | 24 |

EXAMPLE 2
Brownies
- 1 cup butter or margarine (2 sticks)
- 4 squares unsweetened chocolate
- 2 cups sugar or sugar/inulin mixture
- 4 eggs
- 1 8-ounce can walnuts (2 cups), chopped
- 1 cup all-purpose flour
- 1 teaspoon vanilla extract
- ½ teaspoon salt Procedure Preheat oven to 350° F. In silver, round pan, melt margarine and chocolate over very low flame, stirring constantly. Remove from heat and allow to cool for a few minutes. With wooden spoon stir in sugar and eggs until well blended. Then, stir in walnuts, flour, vanilla and salt with wooden spoon. Spray 2 8×8×2 with Wesson non-stick spray. Pour batter into pan. Bake for 30 minutes, testing with toothpick inserted in the center.

To avoid clumping that occurs when inulin is added to wet ingredients, revise recipe for 30%, 40%, 50%, 60%, 70% inulin replacement by mass. For these batches, a calculated amount of 25% aqueous sucralose concentrate is used, for sweetness adjustment. Allow melted chocolate and margarine mixture to cool down in silver, round pan. Combine all the dry ingredients, including the inulin and walnuts, in another pan. Then stir vanilla, sucralose and eggs into the chocolate mixture. Slowly stir in flour mixture. Proceed according to original procedure.

| SENSORY RESULTS | | | | | |
|---|---|---|---|---|---|
| | Control | 40% | 50% | 60% | 70% |
| Appearance | 6.23 | 4.62 | 5.85 | 6.31 | 5.31 |
| Sweetness | 6.73 | 3.23 | 4.38 | 5.53 | 5.46 |
| Texture | 6.96 | 3.23 | 4.62 | 6.31 | 5.42 |
| Flavor | 6.69 | 3.00 | 4.00 | 5.77 | 5.62 |
| Overall Acceptability | 6.65 | 3.19 | 4.46 | 6.00 | 5.50 |
| % Calorie Reduction per 100 g serving | 0 | 7 | 9 | 12 | 14 |

EXAMPLE 3
Old-fashioned Sugar Cookies
- ½ cup butter or margarine
- 1 cup sugar or sugar/inulin mixture
- 1 egg beaten
- 1 tablespoon milk
- ½ teaspoon vanilla
- 1 ½ cup sifted flour
- 1 teaspoon baking powder
- ¼ teaspoon salt Procedure Preheat oven to 375° F. Cream butter or margarine. Beat in sugar, egg, milk and vanilla on medium to high speed. Beat in flour, baking powder and salt to butter mixture. Mix well on medium to high speed for around 2 minutes and then knead lightly with spatula or wooden spoon. Place dough in a plastic container, seal and refrigerate overnight. Using a metal teaspoon or small scoop, measure out a small amount of cool dough. Roll dough into a small ball, and then roll in flour, so that ball is lightly covered with flour. Place ball on a piece of wax paper and flatten. Place circle of dough on a greased cookie sheet. Bake for 10 minutes. Cookies should be lightly brown around the edges. Transfer to wire racks to cool.

To avoid clumping in the preparation of 30%, 40%, 50%, 60%, and 70% inulin replacement by mass batches, add flour to creamed butter and beat to combine. Then add inulin, baking powder and salt, with mixer on low speed to continue. For these batches, a calculated amount of 25% aqueous sucralose concentrate is used, for sweetness adjustment. Beat in egg, milk, and vanilla. Proceed according to original procedure.

| SENSORY RESULTS | | | | | | |
|---|---|---|---|---|---|---|
| | Control | 30% | 40% | 50% | 60% | 70% |
| Appearance | 5.31 | 6.31 | 6.04 | 6.23 | 6.42 | 5.54 |
| Sweetness | 5.81 | 5.35 | 5.38 | 5.96 | 6.08 | 5.00 |
| Texture | 5.00 | 6.19 | 6.08 | 6.15 | 6.38 | 4.85 |
| Flavor | 5.38 | 5.65 | 5.42 | 6.08 | 6.31 | 5.27 |
| Overall Acceptability | 5.27 | 6.12 | 5.77 | 6.27 | 6.42 | 5.27 |
| % Calorie Reduction per 100 g serving | 0 | 8 | 11 | 14 | 17 | 19 |

EXAMPLE 4

Inulin/Maltodextrin Sugar Cookies

½ cup butter

¼ cup inulin

¼ cup maltodextrin 1.6 g 25% aqueous liquid concentrate sucralose 1 egg, beaten 1 tablespoon milk ½ teaspoon vanilla 1 ½ cup sifted flour 1 teaspoon baking powder ¼ teaspoon salt Procedure Pre-heat oven to 375° F. Cream butter. Add flour and combine. Add inulin, maltodextrin, baking powder and salt, with mixer on low speed to combine. Beat in egg, milk, and vanilla. Mix well on medium to high speed for around 2 minutes and then knead lightly with spatula or wooden spoon. Place dough in a plastic container, seal and refrigerate overnight. Using a metal teaspoon or small scoop, measure out a small amount of cool dough. Roll dough into a small ball, and then roll in flour, so that ball is lightly covered with flour. Place ball on a piece of wax paper and flatten. Place circle of dough on a greased cookie sheet. Bake for 10 minutes. Cookies should be lightly brown around the edges. Transfer to wire racks to cool.

| SENSORY RESULTS | | | |
|---|---|---|---|
| | Control | 25% Inulin/25% Maltodextrin | 50% Inulin |
| Appearance | 6.50 | 5.70 | 6.50 |
| Sweetness | 6.05 | 6.70 | 6.60 |
| Texture | 5.80 | 6.10 | 6.90 |
| Flavor | 6.50 | 5.70 | 6.50 |
| Overall Acceptability | 6.50 | 5.85 | 6.55 |
| % Calorie Reduction per 100 g serving | 0 | 6.8 | 14 |

EXAMPLE 5

Yellow Cake (Prepared According to the Formula & Procedure in Example 1.)

| | Sugar Control | 100% inulin | 40% inulin/ 60% maltodextrin | 70% inulin/ 30% maltodextrin |
|---|---|---|---|---|
| Appearance | 7.18 | 4.59 | 4.64 | 4.91 |
| Sweetness | 6.27 | 5.82 | 6.09 | 5.64 |
| Texture | 6.64 | 4.55 | 5.27 | 5.18 |
| Flavor | 6.27 | 5.77 | 5.77 | 5.50 |
| Overall Acceptability | 6.73 | 4.77 | 5.50 | 5.41 |

EXAMPLE 6

Brownies (According to Formula and Procedure in Example 2)

| | Sugar Control | 100% inulin | 40% inulin/ 60% maltodextrin | 70% inulin/ 30% maltodextrin |
|---|---|---|---|---|
| Appearance | 7.08 | 6.67 | 5.17 | 5.92 |
| Sweetness | 7.33 | 6.25 | 5.33 | 5.83 |
| Texture | 6.92 | 4.83 | 5.29 | 5.33 |
| Flavor | 7.42 | 6.33 | 5.25 | 5.58 |
| Overall Acceptability | 7.00 | 6.04 | 5.25 | 5.33 |

The examples which follow illustrate the preparation of old fashioned sugar cookies and fudge brownies, each made with a full sugar control, a batch made with preformed inulin/maltodextrin/sucralose sugar substitute, and a batch made with inulin, maltodextrin and sucralose added to the recipe separately. For home baking uses, the preformed inulin/maltodextrin/sucralose sugar substitute handles better than the corresponding recipes wherein the sucralose, inulin and maltodextrin are added separately (e.g., less tendency to form lumps and inhomogeneity in the batter).

Old Fashioned Sugar Cookies

½ cup butter or margarine 1 cup sugar or sugar substitute 1 egg, beaten 1 tablespoon milk ½ teaspoon vanilla 1 ½ cup sifted flour 1 teaspoon baking powder ¼ teaspoon salt Procedure Cream butter or margarine. On low speed, beat in flour, sugar or sugar substitute, baking powder and salt, until well blended. Add egg, milk, and vanilla, beating dough on low speed after each addition. Transfer dough to plastic container, cover and refrigerate overnight.

Preheat oven to 375° F. Scoop hardened, cool dough with small scoop (about ¾-inch in diameter). Roll dough into small balls and roll lightly in flour. Flatten dough with the bottom of a glass that has been dusted with flour. Bake 2 inches apart on cookie sheet that has been sprayed lightly with non-stick spray. Bake for 8–10 minutes, or until cookies are lightly browned around the edges. The sensory data found for these cookies was the following:

Inulin/Maltodextrin/Sample-Sugar Cookies Sensory Evaluation
Average Rating of 11 Panelists

|  | 1.8 g IN + 2.6 g MA[2] | Control | Sample 1 (preformed 1.8 g In + 2.6 g MA)[3] |
|---|---|---|---|
| Sweetness | 6.4 ± 0.7 | 6.7 ± 2.3 | 5.9 ± 2.0 |
| Flavor | 6.5 ± 0.9 | 6.5 ± 2.2 | 5.5 ± 1.9 |
| Appearance | 6.0 ± 1.2[a] | 6.4 ± 2.0[a] | 4.4 ± 1.9[b] |
| Texture | 6.2 ± 1.2 | 6.2 ± 2.2 | 5.6 ± 1.9 |
| Tooth Packing | 6.4 ± 1.2[a] | 6.7 ± 1.4[a] | 5.0 ± 1.3[b] |
| Overall Acceptability | 6.4 ± 0.6 | 6.5 ± 2.3 | 5.4 ± 1.6 |

[a,b]Means within a row having different superscripts are significantly different (p < 0.05)
[2]1.8 g inulin + 2.6 g maltodextrin per two teaspoons. In this recipe, a total of 40.9 g inulin, 59.1 g maltodextrin and 1.1 g of 25% sucralose liquid concentrate were added separately.
[3]1.8 g inulin + 2.6 g maltodextrin per 2 teaspoons. In this recipe, a total of 40.9 g inulin, 59.1 g maltodextrin and 1.1 g of 25% sucralose liquid concentrate were added as a preblend prepared by spraying an aqueous solution of maltodextrin and the sucralose onto dry inulin in a fluidized bed process.

Fudge Brownies 1 cup butter or margarine (2 sticks)

4 squares unsweetened chocolate 2 cups sugar or sugar substitute 4 eggs 2 cups chopped walnuts (8 oz.)

1 cup all-purpose flour 1 teaspoon vanilla extract

½ teaspoon salt

Procedure

Preheat oven to 350° F. In silver, round pan, melt margarine and chocolate over very low flame, stirring constantly. Remove from heat and allow to cool for a few minutes. In second pan mix flour, salt, sugar or sugar substitute and walnuts. With wooden spoon stir eggs and vanilla in cooled chocolate and margarine mixture. Slowly add flour mixture and stir until well blended. Spray 8×8×2-inch pan with non-stick spray. Pour batter into pan. Bake for 30 minutes, testing with toothpick inserted in the center. The sensory data for these brownies was the following:

Inulin/Maltodextrin/Sample-Fudge Brownie Sensory Evaluation
Average Rating of 12 Panelists

|  | 1.8 g In + 2.6 g MA[4] | Control | Sample 1 (preformed 1.8 g In + 2.6 g MA)[5] |
|---|---|---|---|
| Sweetness | 5.8 ± 1.3[a] | 7.4 ± 0.8[b] | 5.9 ± 1.3[a] |
| Flavor | 5.2 ± 1.1[a] | 7.2 ± 1.3[b] | 5.6 ± 1.0[a] |
| Appearance | 6.1 ± 1.2 | 7.1 ± 1.2 | 5.8 ± 1.5 |
| Texture | 5.7 ± 1.4[a] | 7.2 ± 0.7[b] | 5.7 ± 1.4[a] |
| Tooth Packing | 5.9 ± 1.2[a] | 7.0 ± 0.7[b] | 6.2 ± 0.8[a] |
| Overall Acceptability | 5.6 ± 1.1[a] | 7.5 ± 0.7[b] | 6.0 ± 1.1[a] |

[a,b]Means within a row having different superscripts are significantly different (p < 0.05)
[4]1.8 g inulin + 2.6 g maltodextrin per two teaspoons. In this recipe, a total of 87.4 g inulin, 126.2 g maltodextrin and 2.4 g of 25% sucralose liquid concentrate were added separately.
[5]1.8 g inulin + 2.6 g maltodextrin per 2 teaspoons. In this recipe, a total of 87.4 g inulin, 126.2 g maltodextrin and 2.4 g of 25% sucralose liquid concentrate were added as a preblend prepared by spraying an aqueous solution of maltodextrin and the sucralose onto dry inulin in a fluidized bed process.

The present invention provides a number of advantages, such as the following:

1. Inulin/sucralose mixtures act as soluble fiber delivery systems in palatable formats. This is an important contribution to fiber augmentation that is recommended by national and United Nations public heath authorities. Many of the positive health benefits attributed to increased fiber intake are directly due to soluble fiber (such as inulin). Such benefits include fermentation in the colon by lactobacillus and bifidobacteria, leading to reduction of pH and increase in short chain fatty acids, particularly butyrate and propionate;

2. Inulin/sugar has utility in thermal and/or low pH processes or applications, which limit other sugar replacement concepts such as aspartame. Sensory attributes for sucralose sweetener are superior to other thermally and pH stable high intensity sweeteners such as Ace-K, saccharin, cyclamate, and neohesperidine DHC. In fact, in some cases the present combination of inulin and sucralose actually outperforms sugar in certain applications (such as in cookies, where the inulin/sweetener composition provides more "snap").

3. The present invention permits direct sugar replacement (on a volume:volume basis) with minimal or no recipe modification from the all-sugar original. This is an important advantage, especially in home applications.

4. Inulin/sucralose or other high intensity sweetener blends are suitable for sugar replacement in diets where glycemic control is necessary, e.g., for management of diabetes.

5. The present invention provides granular compositions for home use applications which are more sugar-like than other high intensity sweetener products.

What is claimed is:

1. A method of preparing a comestible comprising the step of incorporating within said comestible a table sugar substitute comprising inulin and a high intensity sweetener, wherein said table sugar substitute has a bulk density from about 0.3 g/ml to about 0.8 g/ml.

2. The method of claim 1, wherein said comestible is selected from the group consisting of an ice cream, a marshmallow, a cookie, a cake, a brownie, a coffee, a tea, a cereal, and a fruit.

3. The method of claim 1, wherein said table sugar substitute comprises a bulking agent.

4. The method of claim 3, wherein said bulking agent is selected from the group consisting of maltodextrin, polydextrose, and an oligosaccharide.

5. The method of claim 1, wherein said high intensity sweetener is sucralose.

6. A method of making a table sugar substitute comprising the step of combining inulin and a high intensity sweetener, wherein said table sugar substitute has a bulk density from about 0.3 g/ml to about 0.8 g/ml.

7. The method of claim 6, wherein said table sugar substitute comprises a bulking agent.

8. The method of claim 7, wherein said bulking agent is selected from the group consisting of maltodextrin, polydextrose and an oligosaccharide.

9. The method of claim 6, wherein said high intensity sweetener is sucralose.

\* \* \* \* \*